(12) United States Patent
Clark et al.

(10) Patent No.: US 8,905,635 B2
(45) Date of Patent: Dec. 9, 2014

(54) TEMPERATURE SENSOR ATTACHMENT FACILITATING THERMAL CONDUCTIVITY TO A MEASUREMENT POINT AND INSULATION FROM A SURROUNDING ENVIRONMENT

(75) Inventors: Matthew Clark, Blaine, MN (US);
Terry Dean Stark, St. Louis Park, MN (US); George Goblish, Hudson, WI (US); Myles Koshiol, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 13/250,478

(22) Filed: Sep. 30, 2011

(65) Prior Publication Data

US 2013/0083326 A1 Apr. 4, 2013

(51) Int. Cl.
*G01C 19/66* (2006.01)
*G01K 1/16* (2006.01)

(52) U.S. Cl.
CPC ........................................ *G01K 1/16* (2013.01)
USPC ........... 374/170; 374/141; 356/459; 73/503.3

(58) Field of Classification Search
CPC ....................................................... G01C 19/66
USPC ......... 374/170, 141, 185, 163, 100, 117–119; 702/130; 356/459; 73/504.08, 503.3, 73/504.12
See application file for complete search history.

(56) References Cited

U.S. PATENT DOCUMENTS

| | | | |
|---|---|---|---|
| 4,035,081 A | * | 7/1977 | Sepp et al. ..................... 356/459 |
| 4,055,166 A | * | 10/1977 | Simpson et al. .............. 600/549 |
| 4,565,941 A | | 1/1986 | Ridgway et al. |
| 4,651,116 A | | 3/1987 | Schloemann |
| 4,951,521 A | | 8/1990 | Jacobson |
| 5,004,639 A | | 4/1991 | Desai |
| 5,088,825 A | | 2/1992 | Derry et al. |
| 5,127,016 A | | 6/1992 | Podgorski |
| 5,148,076 A | | 9/1992 | Albers et al. |
| 5,162,870 A | | 11/1992 | Toth |
| 5,193,391 A | | 3/1993 | Cage |
| 5,309,459 A | | 5/1994 | Hrovat |
| 5,363,194 A | | 11/1994 | Killpatrick et al. |

(Continued)

FOREIGN PATENT DOCUMENTS

WO   9404889   3/1994

OTHER PUBLICATIONS

European Patent Office, "Extended European Search Report", "from Foreign Counterpart of U.S. Appl. No. 13/250,478", Nov. 14, 2013, pp. 1-6, Published in: EP.

(Continued)

*Primary Examiner* — Gail Kaplan Verbitsky
(74) *Attorney, Agent, or Firm* — Fogg & Powers LLC

(57) ABSTRACT

A temperature sensor package includes a temperature sensor having a first side and a second side, wherein the first side of the temperature sensor includes an active region configured for coupling with a target area for temperature measurement of an object. The temperature sensor package further includes a circuit board having a first side and a second side, the first side of the circuit board coupled to the second side of the temperature sensor, wherein the circuit board provides thermal insulation between the active region of the temperature sensor and an environment on the second side of the circuit board.

14 Claims, 5 Drawing Sheets

(56) References Cited

U.S. PATENT DOCUMENTS

| | | | |
|---|---|---|---|
| 5,372,427 A | 12/1994 | Padovani et al. | |
| 5,390,019 A | 2/1995 | Fritze et al. | |
| 5,400,141 A * | 3/1995 | Albers et al. | 356/473 |
| 5,428,190 A | 6/1995 | Stopperan | |
| 5,438,410 A | 8/1995 | Killpatrick et al. | |
| 5,450,198 A | 9/1995 | Killpatrick et al. | |
| 5,486,920 A | 1/1996 | Killpatrick et al. | |
| 5,767,404 A | 6/1998 | Kaiser et al. | |
| 5,780,771 A | 7/1998 | Beckwith et al. | |
| 5,786,895 A * | 7/1998 | Mitchell et al. | 356/467 |
| 5,831,333 A | 11/1998 | Malladi et al. | |
| 6,108,358 A | 8/2000 | Albers | |
| 6,195,261 B1 | 2/2001 | Babutzka et al. | |
| 6,208,414 B1 | 3/2001 | Killpatrick et al. | |
| 6,625,854 B1 | 9/2003 | Sudol et al. | |
| 6,870,867 B2 | 3/2005 | Pontis et al. | |
| 6,918,297 B2 | 7/2005 | MacGugan | |
| 6,934,448 B2 | 8/2005 | Akashi et al. | |
| 6,953,985 B2 | 10/2005 | Lin et al. | |
| 7,117,934 B2 | 10/2006 | Lomax, Jr. et al. | |
| 7,308,827 B2 | 12/2007 | Holt et al. | |
| 7,526,402 B2 | 4/2009 | Tanenhaus et al. | |
| 7,535,574 B2 | 5/2009 | Beckwith et al. | |
| 7,697,587 B2 * | 4/2010 | Backes et al. | 372/94 |
| 8,018,229 B1 | 9/2011 | Horning et al. | |
| 8,162,539 B2 * | 4/2012 | Mau et al. | 374/170 |
| 8,490,570 B2 * | 7/2013 | Kuramoto | 116/216 |
| 8,781,778 B2 * | 7/2014 | Touchberry et al. | 702/94 |
| 2002/0166379 A1 | 11/2002 | Paros et al. | |
| 2004/0169244 A1 | 9/2004 | MacGugan | |
| 2005/0056457 A1 | 3/2005 | Gall et al. | |
| 2006/0122473 A1 * | 6/2006 | Kill et al. | 600/300 |
| 2006/0196266 A1 | 9/2006 | Holt et al. | |
| 2006/0271246 A1 | 11/2006 | Bell et al. | |
| 2007/0032951 A1 | 2/2007 | Tanenhaus et al. | |
| 2007/0170438 A1 | 7/2007 | Partridge et al. | |
| 2007/0170439 A1 | 7/2007 | Partridge et al. | |
| 2007/0170440 A1 | 7/2007 | Partridge et al. | |
| 2007/0170528 A1 | 7/2007 | Partridge et al. | |
| 2007/0170529 A1 | 7/2007 | Partridge et al. | |
| 2007/0170530 A1 | 7/2007 | Partridge et al. | |
| 2007/0170531 A1 | 7/2007 | Partridge et al. | |
| 2007/0170532 A1 | 7/2007 | Partridge et al. | |
| 2007/0172976 A1 | 7/2007 | Partridge et al. | |
| 2007/0181962 A1 | 8/2007 | Partridge et al. | |
| 2007/0206655 A1 * | 9/2007 | Haslett et al. | 374/141 |
| 2007/0248142 A1 | 10/2007 | Rountree et al. | |
| 2007/0266784 A1 | 11/2007 | Lust et al. | |
| 2007/0282218 A1 * | 12/2007 | Yarden | 600/549 |
| 2008/0290494 A1 | 11/2008 | Lutz | |
| 2009/0212386 A1 | 8/2009 | Ridley et al. | |
| 2009/0260435 A1 | 10/2009 | Mayer-Wegelin et al. | |
| 2009/0316751 A1 * | 12/2009 | Mau et al. | 374/165 |
| 2010/0014092 A1 * | 1/2010 | Fellows et al. | 356/473 |
| 2011/0024860 A1 | 2/2011 | Herrnsdorf et al. | |
| 2011/0051774 A1 * | 3/2011 | Quinn et al. | 374/121 |
| 2011/0274133 A1 * | 11/2011 | Schober et al. | 372/59 |
| 2012/0065540 A1 * | 3/2012 | Yarden et al. | 600/549 |
| 2013/0085699 A1 * | 4/2013 | Touchberry et al. | 702/94 |
| 2013/0085709 A1 * | 4/2013 | Stark et al. | 702/133 |

OTHER PUBLICATIONS

Beyschlag, "PTS Series—Pt-Sensors Platinum SMD Flat Chip Temperature Sensor", May 6, 2011, pp. 1-6, Publisher: Vishay.

Dorobantu et al., "Investigation of Navigation-Grade RLG SIMU type iNAV-RQH", 2004, pp. 1-44, No. 16, Publisher: Technische Universitat Munchen.

"Platinum Chip SMD Temperature Sensor", "downloaded from http://www.enercorp.com/temp/products/pdf/pcs11503.pdf on Sep. 11, 2011 (http://www.enercorp.com/New_Products/RTD_Temperature_Sensor.htm)", Apr. 2001, p. 21, Publisher: ENERCORP instruments ltd.

Enriquez, "Hints and Tips for using Surface Mount Technology (SMT)", Aug. 2001, pp. 1-11.

Finstad, "Basics of Flex Circuit Design", "downloaded from http://www.minco.com/download-media.aspx?id=2304&wp=Download on Sep. 22, 2011", 2008, pp. 1-12, Publisher: MINCO.

Finstad, "Balancing the Electrical and Mechanical Requirements of Flexible Circuits", "downloaded from http://www.minco.com/download-media.aspx?id=2302&wp=Download on Sep. 22, 2011", 2008, pp. 1-10, Publisher: MINCO.

Guo et al, "Investigation on the temperature compensating model for ring laser gyroscope", "Chinese Optics Letters", Oct. 10, 2006, pp. 1-4, vol. 4, No. 10.

"Thermal Sensors Sensing and Control Product Range Guide", "downloaded from http://sensing.honeywell.com/index.cfm/ci_id/156871/la_id/1/ on Sep. 23, 2011", Aug. 2011, pp. 1-20, Publisher: Honeywell International Inc.

"Installation Instructions B 90.6121.4 Application notes for platinum-chip temperature sensors", "downloaded from http://alicedcs.web.cern.ch/alicedcs/Documents/JUMO/JUMO.b90.6121.4gb.pdf on Sep. 23, 2011", May 2005, pp. 1-2.

King et al, "Inertial Navigation—Forty Years of Evolution", "GEC Review", 1998, pp. 140-149, vol. 13, No. 3, Publisher: Marconi Electronic Systems Ltd.

"Installation Instruction Rhodium-Iron Resistance Temperature Sensor RF-100T-AA or RF-100U-AA Package", "downloaded from http://www.lakeshore.com/pdf_files/Obsolete/F024-00-00.pdf on Sep. 23, 2011", Jan. 17, 2000, pp. 1-2, Publisher: Lake Shore Cryotronics.

Mark et al, "A Resolution Enhancement Technique for Laser Gyros", "downloaded from http://www.es.northropgrumman.com/media/whitepapers/assets/Resolution_Enhancement_Techniq.pdf on Sep. 22, 2011", May 26, 1997, pp. 1-14.

"Selecting Temperature Sensors for System Measurement and Protection", "downloaded from http://pdfserv.maxim-ic.com/en/an/AN3229.pdf on Sep. 23, 2011", Jul. 8, 2004, pp. 1-5.

"Designing for Flexibility and Reliability", "downloaded from http://www.minco.com/WorkArea/linkit.aspx?LinkIdentifier=id&ItemID=1132 on Sep. 22, 2011", 2006, pp. 1-5, Publisher: MINCO.

"Flex Circuits Design Guide", "downloaded from http://www.minco.com/uploadedFiles/Products/Flex_Circuits/Technical_Specifications/FC302.pdf on Sep. 22, 2011", 2007, pp. 1-32, Publisher: MINCO.

"Pt100-Temperature-Sensors Type TF101", "downloaded from http://www.ziehl.de/ziehl/englisch/temperature_monitoring/5pt100sensoren_e.pdf on Sep. 23, 2011", Jan. 2011, pp. 57-60, Publisher: ZIEHL.

"Advanced-Design Surface-Mount RTD Provides Class A Accuracy", "downloaded from http://www.omega.com/Temperature/pdf/SA1-RTD.pdf on Sep. 23, 2011 (see also http://www.omega.com/pptst/SA1-RTD.html)", Jun. 2010, pp. 107-109, Publisher: Omega.

"What are RTD Sensors? Why Use Them? How Do They Work?", "downloaded from http://www.omega.com/temperature/pdf/rtd_gen_specs_ref.pdf on Sep. 23, 2011", Aug. 2010, pp. C-11-C-14.

"High Temperature Sensor Amplifier Module", "Specific Components", May 2009, pp. 1-2, Publisher: SGA.

Volk et al, "Multioscillator Ring Laser Gyroscopes and Their Applications", "downloaded from http://www.es.northropgrumman.com/media/whitepapers/assets/Multioscillator_Ring_Laser_Gyr.pdf on Sep. 22, 2011", 1999, pp. 1-20.

Yu et al, "Novel temperature modeling and compensation method for bias of ring laser gyroscope based on least-squares support vecto", "Chinese Optics Letters", May 10, 2011, pp. 1-4, vol. 9, No. 5.

* cited by examiner

TEMPERATURE SENSOR ATTACHMENT FACILITATING THERMAL CONDUCTIVITY TO A MEASUREMENT POINT AND INSULATION FROM A SURROUNDING ENVIRONMENT

BACKGROUND

Temperature sensors are used to sense temperatures of components within electronic systems. Temperature sensors used to sense temperatures of components include thermistors, thermocouples, resistance temperature detectors (RTDs) and integrated circuit (IC) temperature sensors. Some temperature sensors are available in surface mount packages (such as thermistors, RTDs, and IC temperatures sensors). Surface mount temperature sensors can be used to sense temperatures of PC boards and substrates. Surface mount temperature sensors can be affected by environmental changes and variations created by heat sources, such as convection currents, infrared radiation, and other components.

SUMMARY

A temperature sensor package includes a temperature sensor having a first side and a second side, wherein the first side of the temperature sensor includes an active region configured for coupling with a target area for temperature measurement of an object. The temperature sensor package further includes a circuit board having a first side and a second side, the first side of the circuit board coupled to the second side of the temperature sensor, wherein the circuit board provides thermal insulation between the active region of the temperature sensor and an environment on the second side of the circuit board.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
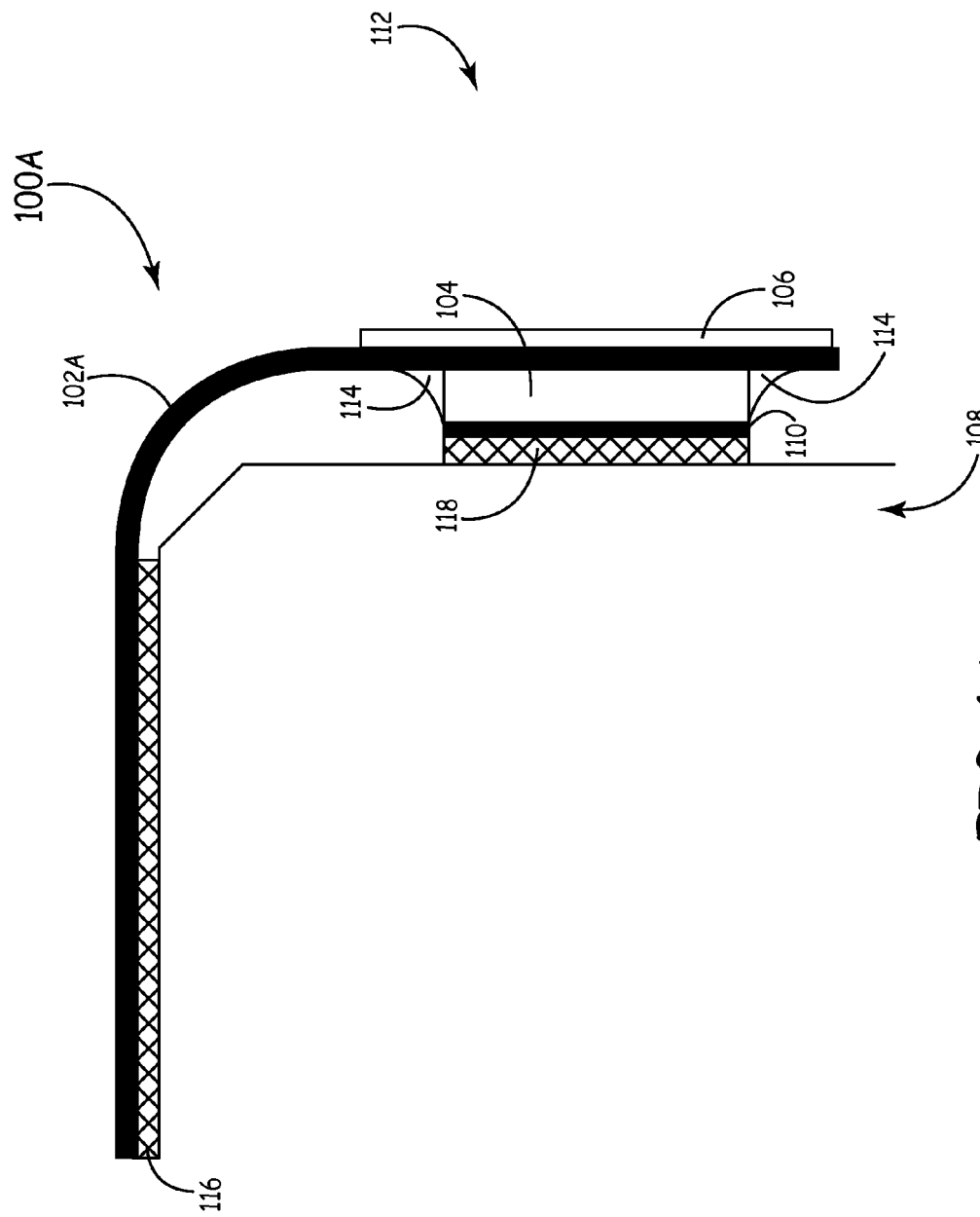
FIGS. 1A-1B are side view cross-sectional diagrams depicting exemplary embodiments of a circuit board assembly having a temperature sensor attachment providing maximum thermal conductivity to the target area and insulation from a surrounding environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other exemplary embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below provide systems and methods for temperature sensor attachment facilitating thermal conductivity to target area for temperature measurement and insulation from the surrounding environment. More specifically, a temperature sensor can be positioned in a system such that its active region is close to the target location for measurement. The active region of the temperature sensor can be thermally coupled to the component using a thermally conductive adhesive. In addition, the circuit board material and any stiffeners provide additional thermal insulation from the surrounding environment to the temperature sensor.

Figure 1B:
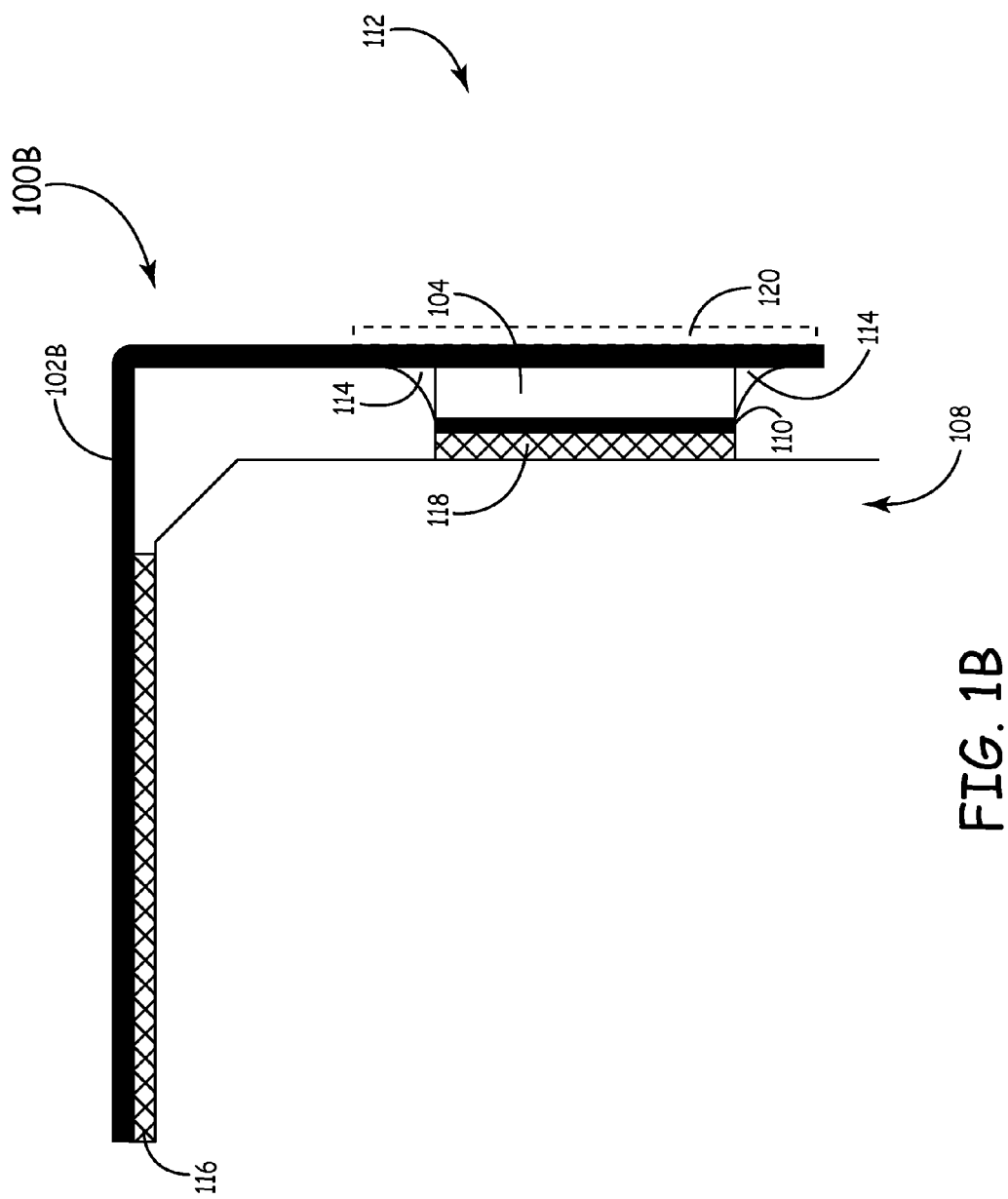

FIGS. 1A-1B are side view cross-sectional diagrams depicting circuit board assemblies 100 including circuit boards 102 and temperature sensors 104 facilitating thermal conductivity to the measurement point and insulation from the surrounding environment. Each of FIGS. 1A-1B illustrates a different embodiment of the circuit board assembly 100, labeled 100A and 100B respectively.

FIG. 1A is a side view cross-sectional diagram depicting circuit board assembly 100A including a flexible circuit board 102A and a temperature sensor 104 facilitating thermal conductivity to the measurement point and insulation from a surrounding environment. The circuit board assembly 100A includes the flexible circuit board 102A, the temperature sensor 104, and a stiffener 106. The circuit board assembly 100A is attached to a substrate 108, such as a laser block. In other exemplary embodiments, the system is attached to another component or object.

In exemplary embodiments, the flexible circuit board 102A includes a plurality of conductive traces. In other exemplary embodiments, the flexible circuit board 102A includes a single conductive trace. In exemplary embodiments, the flexible circuit board 102A includes conductive contact pads coupled to the plurality of conductive traces. The combination of the contact pads and conductive traces allows for coupling and communication between various devices. In exemplary embodiments, the flexible circuit board 102A has devices coupled to it through various methods, such as surface mounting or through-hole mounting. In exemplary embodiments, the flexible circuit board 102A includes through-hole vias allowing electrical signals and power to travel from one side of the flexible circuit board to the other. In exemplary embodiments, the flexible circuit board 102A includes a plurality of layers with through-hole vias and conductive traces allowing electric signals and power to travel between the plurality of layers.

In some embodiments, the flexible circuit board 102A is a flex circuit designed using flexible printed circuit board (PCB). In other exemplary embodiments, the flexible circuit board 102A is a rigid-flex circuit with portions of rigid PCB and portions of flexible PCB. The flexible aspect of flexible circuit board 102A allows the flexible circuit board material to bend around the corner of a substrate 108 or other component or object to which it is attached as shown in FIG. 1A. In other exemplary embodiments, other suitable circuit board materials are used.

The temperature sensor 104 is used to sense the temperature of the substrate 108 (or other component or object to which it is attached). In exemplary embodiments, the temperature sensor 104 is selected from at least one of a surface mounted thermistor, thermocouple, RTD, or IC temperature sensor. In other exemplary embodiments, other types of suitable temperature sensors are used. The temperature sensor 104 includes an active region 110, where the temperature sensor 104 is most sensitive to temperature sensing. The temperature sensor 104 is attached to the underside of the flexible circuit board 102A so that it is facing toward the side of the substrate 108 (or other component or object) when the flexible circuit board 102A is bent down toward the side of the substrate 108 (or other component or object). In some embodiments, the flexible circuit board 102A itself is thermally insulative, providing thermal insulation between the temperature sensor 104 and the surrounding environment 112, and particularly between the active region 110 of the temperature sensor 104 and the surrounding environment 112.

The temperature sensor 104 is attached to the underside of the flexible circuit board 102A using solder 114. In other exemplary embodiments, the temperature sensor 104 is attached to the flexible circuit board 102A using other materials or through other types of bonding. In other exemplary embodiments, the circuit board assembly 100A includes a plurality of temperature sensors attached to the underside of the flexible circuit board 102A.

The stiffener 106 is attached to the opposite side of the flexible circuit board 102A opposite the temperature sensor 104 to stiffen the flexible circuit board 102A in the area where the temperature sensor 104 is attached. In exemplary embodiments, the stiffener 106 is attached to the opposite side of the flexible circuit board 102A before the temperature sensor 104 is soldered to the underside of the flexible circuit board 102A so that the flexible circuit board 102A can better withstand the soldering process. In exemplary embodiments, the stiffener 106 is thermally insulative, providing additional thermal insulation (in addition to the flexible circuit 102A itself) between the temperature sensor 104 and the surrounding environment 112, and particularly between the active region 110 of the temperature sensor 104 and the surrounding environment 112.

An assembled circuit board assembly 100A is attached to the substrate 108 (or other component or object) using adhesives or other types of bonding. In particular, the underside of the circuit board assembly 100A is attached to the top side of the substrate 108 (or other component or object) using a first adhesive 116. In some embodiments, the first adhesive is both electrically and thermally insulative. In other exemplary embodiments, the substrate is attached to the top side of the substrate 108 (or other component or object) using other types of bonding.

In addition, the active region 110 of the temperature sensor 104 is attached to the side of the substrate 108 using a thermally conductive adhesive 118. In exemplary embodiments, the thermally conductive adhesive 118 is also electrically insulative so that is does not conduct electric signals. When fully assembled and attached to the substrate 108 (or other component or object), the assembled circuit board assembly 100A facilitates thermal conductivity between the substrate 108 (or other component or object) and the active region 110 of the temperature sensor 104 because the only thing between the substrate 108 and the active region 110 of the temperature sensor 104 is the thermally conductive adhesive 118. In addition, both the flexible circuit 102A and the stiffener 106 provide thermal insulation between the active region 110 of the temperature sensor 104 and the surrounding environment 112.

Thus, by using standard manufacturing techniques and commercially available parts, the novel structure of the circuit board assembly 100A allows for more accurate temperature sensing of the substrate 108 (or other component or object) while minimizing cost and complexity increases in the design, manufacture, and installation of the circuit board assembly 100A.

FIG. 1B is a side view cross-sectional diagram depicting circuit board assembly 100B including a rigid circuit board 102B and a temperature sensor 104 facilitating thermal conductivity to the measurement point and insulation from a surrounding environment. The circuit board assembly 100B includes the rigid circuit board 102B and the temperature sensor 104. The circuit board assembly is attached to a substrate 108, such as a laser block. In other exemplary embodiments, the system is attached to another component or object.

In exemplary embodiments, the rigid circuit board 102B includes a plurality of conductive traces. In other exemplary embodiments, the flexible circuit board 102B includes a single conductive trace. In exemplary embodiments, the flexible circuit board 102B includes conductive contact pads coupled to the plurality of conductive traces. The combination of the contact pads and conductive traces allows for coupling and communication between various devices. In exemplary embodiments, the rigid circuit board 102B has devices coupled to it through various methods, such as surface mounting or through-hole mounting. In exemplary embodiments, the rigid circuit board 102B includes through-hole vias allowing electrical signals and power to travel from one side of the flexible circuit board to the other. In exemplary embodiments, the rigid circuit board 102B includes a plurality of layers with through-hole vias and conductive traces allowing electric signals and power to travel between the plurality of layers.

In some embodiments, the rigid circuit board 102B is a rigid circuit designed using rigid printed circuit board (PCB). In other exemplary embodiments, the rigid flexible circuit board is made of other materials or through other processes than rigid PCB. While the rigidness of the rigid circuit board 102B does not allow the rigid circuit board to bend around the corner of the substrate as with the flexible circuit board 102A, the rigid circuit board 102B can be constructed to fit over the corner of a substrate 108 or other component or object to which it is attached as shown in FIG. 1B. In other exemplary embodiments, other suitable circuit board materials are used.

The temperature sensor 104 is used to sense the temperature of substrate 108 (or other component or object to which it is attached). In exemplary embodiments, the temperature sensor 104 is selected from at least one of a surface mounted thermistor, thermocouple, RTD, or IC temperature sensor. In other exemplary embodiments, other types of suitable temperature sensors are used. The temperature sensor 104 includes an active region 110, where the temperature sensor 104 is most sensitive to temperatures sensing. The temperature sensor 104 is attached to the underside of the rigid circuit board 102B so that it is facing toward the side of the substrate 108 (or other component or object) once it is installed on the substrate 108 (or other component or object). In some embodiments, the rigid circuit board 102B itself is thermally insulative, providing thermal insulation between the temperature sensor 104 and the surrounding environment 112, and particularly between the active region 110 of the temperature sensor 104 and the surrounding environment 112.

The temperature sensor 104 is attached to the underside of the rigid circuit board 102B using solder 114. In other exemplary embodiments, the temperature sensor 104 is attached to the rigid circuit board 102B using other materials or through other types of bonding. In other exemplary embodiments, the circuit board assembly 100B includes a plurality of temperature sensors attached to the underside of the rigid circuit board 102B.

While a stiffener (such as stiffener 106) is not required in the circuit board assembly 100A using the rigid circuit board 102B, in exemplary embodiments, an optional sheet of thermally insulative material 120 (such as stiffener 106) is attached to the opposite side of the rigid circuit board 102B, providing additional thermal insulation (in addition to the rigid circuit board 102B itself) between the temperature sensor 104 and the surrounding environment 112, and particularly between the active region 110 of the temperature sensor 104 and the surrounding environment 112. In some exemplary embodiments, a stiffener 106 is included to provide additional rigidity to rigid circuit board 102B and additional thermal insulation.

An assembled circuit board assembly 100B is attached to the substrate 108 (or other component or object) using adhesives or other types of bonding. In particular, the underside of the circuit board assembly 100B is attached to the top side of the substrate 108 (or other component or object) using a first adhesive 116. In some embodiments, the first adhesive is both electrically and thermally insulative. In other exemplary embodiments, the substrate is attached to the top side of the substrate 108 (or other component or object) using other types of bonding.

In addition, the active region 110 of the temperature sensor 104 is attached to the side of the substrate 108 using a thermally conductive adhesive 118. In exemplary embodiments, the thermally conductive adhesive 118 is also thermally insulative so that it does not conduct electric signals. When fully assembled and attached to the substrate 108 (or other component or object), the assembled circuit board assembly 100B facilitates thermal conductivity between the substrate 108 (or other component or object) and the active region 110 of the temperature sensor 104 because the only thing between the substrate 108 and the active region 110 of the temperature sensor 104 is the thermally conductive adhesive 118. In addition, both the rigid circuit board 102A and the optional sheet of thermally insulative material 120 provide thermal insulation between the active region 110 of the temperature sensor 104 and the surrounding environment 112.

Thus, by using standard manufacturing techniques and commercially available parts, the novel structure of the circuit board assembly 100B allows for more accurate temperature sensing of the substrate 108 (or other component or object) while minimizing cost and complexity increases in the design, manufacturer, and installation of the circuit board assembly 100B.

Figure 2:
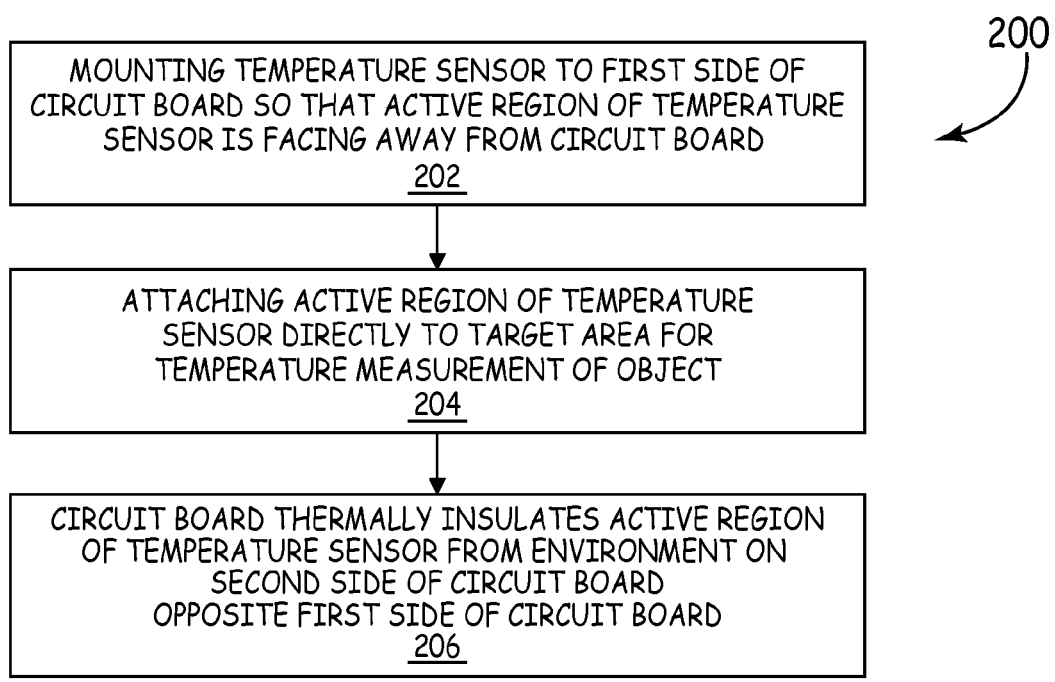
FIG. 2 is a flow chart illustrating an example method for manufacturing a system having a temperature sensor facilitating thermal conductivity to a measurement point and insulation from a surrounding environment.

FIG. 2 is a flow chart illustrating one embodiment of a method 200 for manufacturing a system having a temperature sensor facilitating thermal conductivity to a target measurement area and insulation from a surrounding environment. At block 202, a temperature sensor is mounted to a first side of circuit board so that an active region of the temperature sensor is facing away from the circuit board. At block 204, the temperature sensor is attached directly to a target area for temperature measurement of an object. At block 206, the circuit board thermally insulates the active region of the temperature sensor from an environment on a second side of the circuit board opposite the first side of the circuit board.

Figure 3:
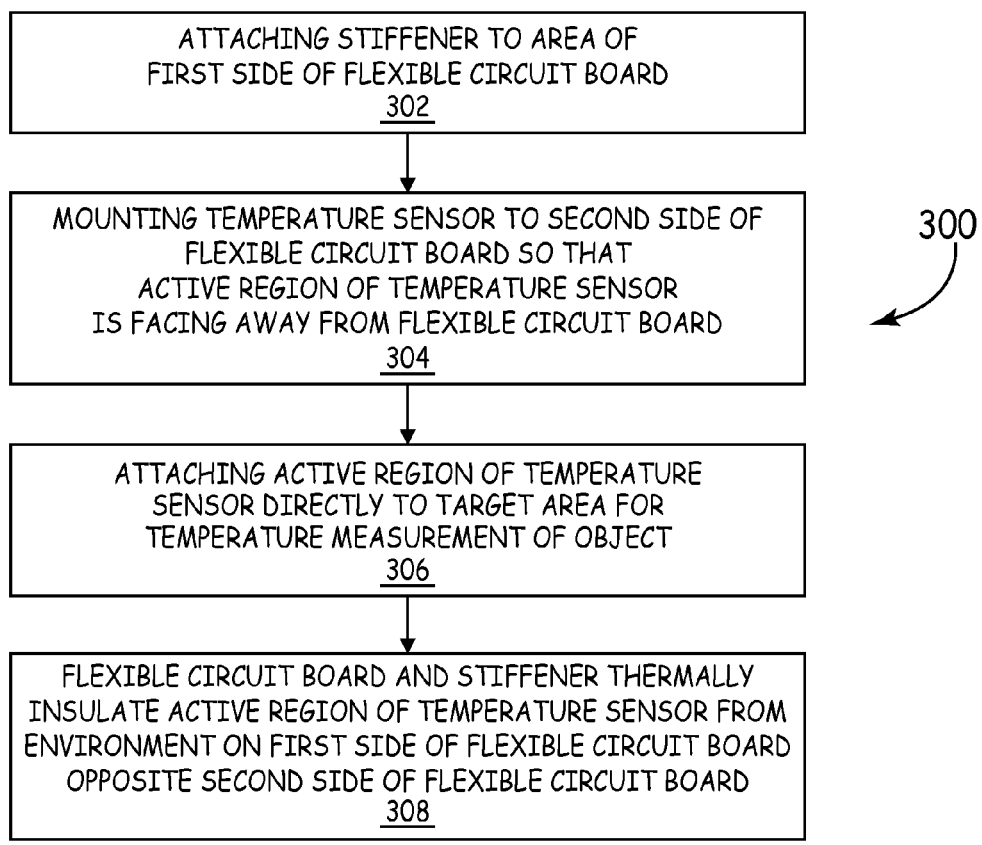
FIG. 3 is a flow chart illustrating an example method for manufacturing a system having a temperature sensor facilitating thermal conductivity to a measurement point and insulation from a surrounding environment using a flexible circuit board.

FIG. 3 is a flow chart illustrating one embodiment of a method 300 for manufacturing a system having a temperature sensor facilitating thermal conductivity to a target measurement area and insulation from a surrounding environment using a flexible circuit board. At block 302, a stiffener is attached to an area of a first side of a flexible circuit board. Attaching the stiffener facilitates the subsequent mounting of the temperature sensor. At block 304, a temperature sensor is mounted to a second side of the flexible circuit board so that the active region of the temperature sensor is facing away from the flexible circuit board. At block 306, the temperature sensor is attached directly to a target area for temperature measurement of an object. At block 308, the flexible circuit board and the stiffener thermally insulate the active region of the temperature sensor from an environment on a first side of the flexible circuit board opposite the second side of the flexible circuit board.

Figure 4:
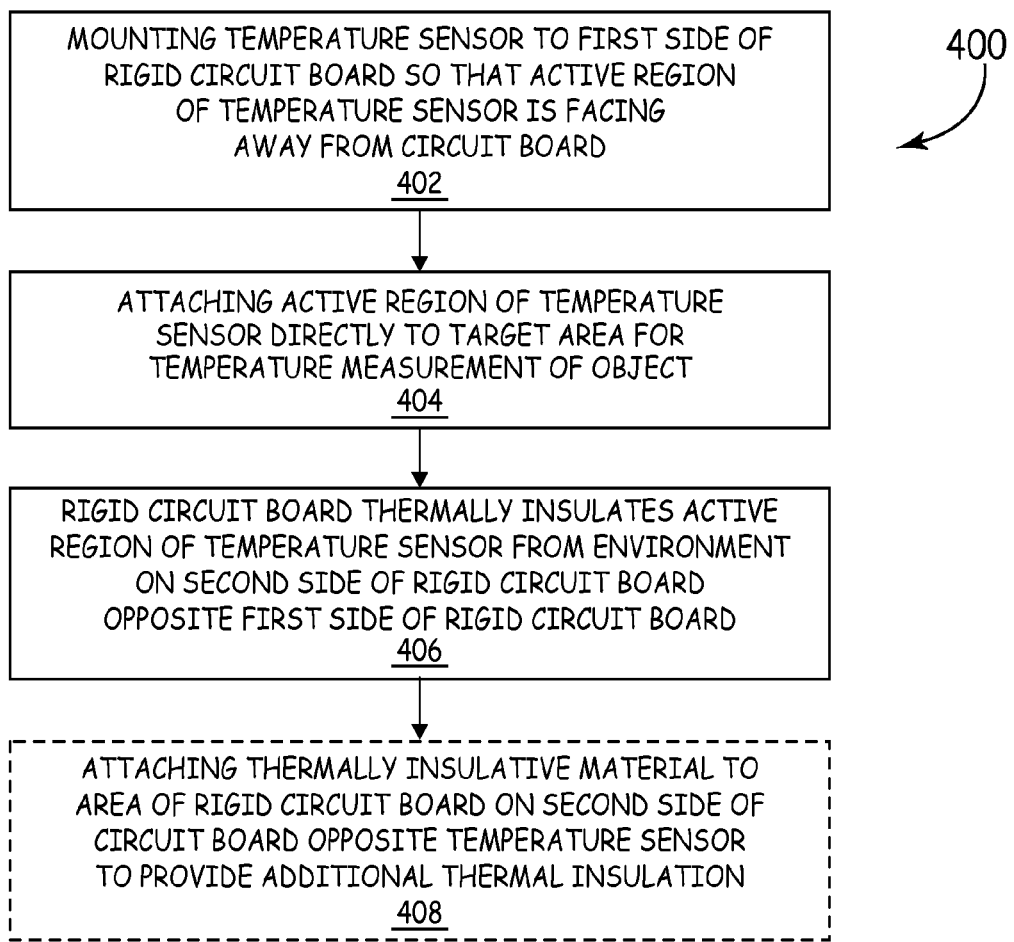
FIG. 4 is a flow chart illustrating an example method for manufacturing a system having a temperature sensor facilitating thermal conductivity to a measurement point and insulation from a surrounding environment using a rigid circuit board.

FIG. 4 is a flow chart illustrating one embodiment of a method 400 for manufacturing a system having a temperature sensor facilitating thermal conductivity to a target measurement area and insulation from a surrounding environment using a rigid circuit board. At block 402, a temperature sensor is mounted to a first side of a rigid circuit board so that an active region of the temperature sensor is facing away from the circuit board. At block 404, the temperature sensor is attached directly to a target area for temperature measurement of an object. At block 406, the circuit board thermally insulates the active region of the temperature sensor from an environment on a second side of the rigid circuit board opposite the first side of the rigid circuit board. At optional block 408, a thermally insulative material can be attached to an area of the rigid circuit board on the second side of the circuit board opposite the temperature sensor to further thermally insulate the active region of the temperature sensor from the environment on the second side of the rigid circuit board opposite the first side of the rigid circuit board.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A temperature sensor package comprising:
   a temperature sensor having a first side and a second side, wherein the first side of the temperature sensor includes an active region configured for coupling with a target area for temperature measurement of an object within a laser gyroscope; and
   a circuit board having a first side and a second side, the first side of the circuit board coupled to the second side of the temperature sensor, wherein the circuit board provides thermal insulation between the active region of the temperature sensor and an environment on the second side of the circuit board.

2. The temperature sensor package of claim 1, further comprising:
   a thermal insulator having a first side and a second side, the first side of the thermal insulator coupled to the second side of the circuit board; and
   wherein the thermal insulator further provides thermal insulation between the active region of the temperature sensor and the environment on the second side of the circuit board.

3. The temperature sensor package of claim 2, wherein the circuit board is a flexible circuit board; and
   wherein the thermal insulator is a stiffener configured to stiffen the flexible circuit board facilitating mounting of the second side of the temperature sensor to the first side of the circuit board.

4. The temperature sensor package of claim 3, wherein the second side of the temperature sensor is attached to the first side of the circuit board by soldering.

5. The temperature sensor package of claim 2, wherein the first side of the thermal insulator is positioned on the second side of the circuit board substantially opposite the second side of the temperature sensor.

6. The temperature sensor package of claim 2, wherein the first side of the thermal insulator covers a first area of the second side of the circuit board at least as large as a second area of the first side of the circuit board covered by the second side of the temperature sensor.

7. The temperature sensor package of claim 1, wherein the object is a substrate.

8. The temperature sensor package of claim 1, wherein the object is a laser block; and
wherein the laser gyroscope is a ring laser gyroscope.

9. The temperature sensor package of claim 1, wherein the object is a laser block.

10. The temperature sensor package of claim 1, wherein the laser gyroscope is a ring laser gyroscope.

11. A ring laser gyroscope package comprising:
a laser block having a top surface and a side surface;
a temperature sensor having a first side and a second side, wherein the first side includes an active region attached to a target area of the side surface of the laser block for temperature measurement of the laser block; and
a circuit board having a first side and a second side, a first portion of the first side of the circuit board attached to the top portion of the laser block and a second portion of the first side of the circuit board attached to the second side of the temperature sensor, wherein the circuit board provides thermal insulation between the active region of the temperature sensor and an environment on the second side of the circuit board.

12. The gyroscope package of claim 11, further comprising:
a thermal insulator having a first side and a second side, the first side of the thermal insulator coupled to the second side of the circuit board; and
wherein the thermal insulator provides further thermal insulation between the active region of the temperature sensor and the environment on the second side of the circuit board.

13. The gyroscope package of claim 12, wherein the circuit board is a flexible circuit board; and
wherein the thermal insulator is a stiffener configured to stiffen the flexible circuit board facilitating mounting of the second side of the temperature sensor to the first side of the circuit board.

14. The gyroscope package of claim 13, wherein the second side of the temperature sensor is attached to the first side of the circuit board by soldering.

\* \* \* \* \*

UNITED STATES PATENT AND TRADEMARK OFFICE
CERTIFICATE OF CORRECTION

| | | |
|---|---|---|
| PATENT NO. | : 8,905,635 B2 | Page 1 of 1 |
| APPLICATION NO. | : 13/250478 | |
| DATED | : December 9, 2014 | |
| INVENTOR(S) | : Clark et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this
Thirteenth Day of October, 2015

Michelle K. Lee
*Director of the United States Patent and Trademark Office*